(12) United States Patent
De Man et al.

(10) Patent No.: US 8,763,865 B2
(45) Date of Patent: Jul. 1, 2014

(54) METERING DEVICE FOR DISPENSING A DOSE OF PRESSURIZED FLUID

(75) Inventors: Eelco De Man, Vlijmen (NL); Frank Smits, Heesch (NL); Wouter Stinesen, Oosterhout (NL)

(73) Assignee: I.P.S. Research and Development B.V. (NL)

( * ) Notice: Subject to any disclaimer, the term of this patent is extended or adjusted under 35 U.S.C. 154(b) by 1125 days.

(21) Appl. No.: 12/525,419

(22) PCT Filed: Jan. 31, 2007

(86) PCT No.: PCT/IB2007/050317
§ 371 (c)(1),
(2), (4) Date: Sep. 25, 2009

(87) PCT Pub. No.: WO2008/093172
PCT Pub. Date: Aug. 7, 2008

(65) Prior Publication Data
US 2010/0006601 A1    Jan. 14, 2010

(51) Int. Cl.
*B65D 83/54*    (2006.01)
(52) U.S. Cl.
CPC ..................................... *B65D 83/54* (2013.01)
USPC ........... 222/335; 222/341; 222/389; 222/396; 222/399; 222/402.13; 222/402.15
(58) Field of Classification Search
CPC ....................................................... B65D 83/54
USPC .............. 222/335, 341, 355, 402.2, 514, 389, 222/396, 399, 402.13, 402.15
See application file for complete search history.

(56) References Cited

U.S. PATENT DOCUMENTS

| | | | |
|---|---|---|---|
| 3,052,382 A | | 11/1959 | Gawthrop |
| 3,018,928 A | * | 1/1962 | Meshberg ...................... 222/335 |
| 3,180,535 A | * | 4/1965 | Ward .............................. 222/335 |
| 3,377,004 A | * | 4/1968 | Kjelson ...................... 222/402.2 |

(Continued)

FOREIGN PATENT DOCUMENTS

| | | |
|---|---|---|
| GB | 1524293 | 9/1978 |
| WO | WO2004022143 A2 | 3/2004 |
| WO | WO2005082744 A1 | 9/2005 |

OTHER PUBLICATIONS

International Search Report for International Application No. PCT/IB2007/050317 filed Jan. 31, 2007 (3 pages).

(Continued)

*Primary Examiner* — Daniel R Shearer
(74) *Attorney, Agent, or Firm* — McCormick, Paulding & Huber LLP

(57) ABSTRACT

A novel metering device (1) for dispensing a dose of a pressurized fluid is described. A dispensing valve body (3) is mounted in a fluid-tight manner to the lid (4) of a pressurized container (5), which circumvents a valve element (9). A valve delivery tube (10) is connected to the valve element (9). A chamber (13) surrounds the valve body (3), in which a piston (17) is reciprocable between an upper and a lower position, which define the dispensing dose. A clearance is provided between the piston (17) and the inner wall (23) of the chamber (13), such that pressurized fluid can flow into the chamber based on a pressure difference between the container (5) and the chamber (13), and the piston (17) is adapted to seal the valve body (3) when being in the upper position.

13 Claims, 7 Drawing Sheets

(56) References Cited

U.S. PATENT DOCUMENTS

| | | | | |
|---|---|---|---|---|
| 4,577,784 A | * | 3/1986 | Brunet | 222/402.2 |
| 5,183,187 A | * | 2/1993 | Martin et al. | 222/287 |
| 5,915,598 A | * | 6/1999 | Yazawa et al. | 222/402.1 |
| 6,273,304 B1 | * | 8/2001 | Hoshino | 222/402.2 |
| 7,124,915 B2 | * | 10/2006 | Restive | 222/153.11 |
| 7,699,192 B2 | * | 4/2010 | Dunne | 222/153.11 |
| 2004/0139965 A1 | | 7/2004 | Greenleaf et al. | |
| 2007/0125809 A1 | * | 6/2007 | Regan et al. | 222/389 |

OTHER PUBLICATIONS

Written Opinion of the International Searching Authority for International Application No. PCT/IB2007/050317 filed Jan. 31, 2007 (5 pages).

* cited by examiner

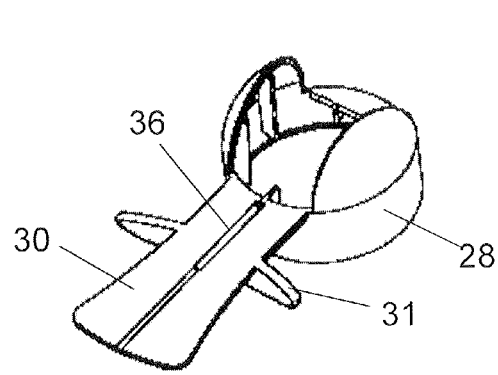# 
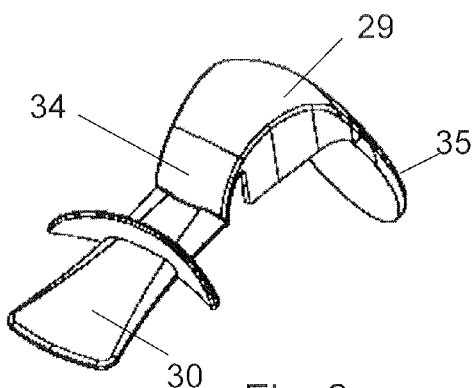
Fig. 8a
Fig. 9a
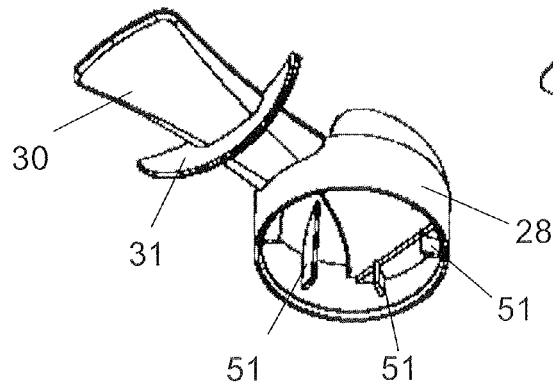
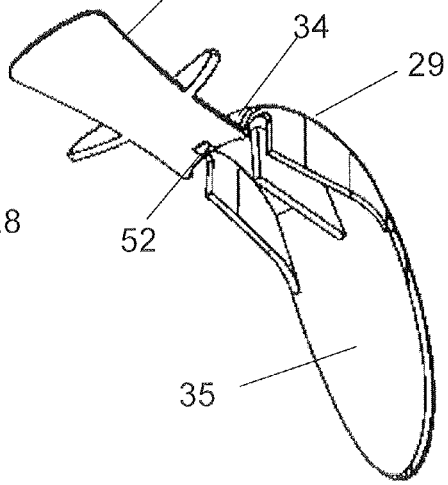
Fig. 8b
Fig. 9b

METERING DEVICE FOR DISPENSING A DOSE OF PRESSURIZED FLUID

CROSS REFERENCE TO RELATED APPLICATIONS

This application is entitled to the benefit of and incorporates by reference essential subject matter disclosed in International Patent Application No. PCT/IB2007/050317 filed on Jan. 31, 2007.

FIELD OF THE INVENTION

The invention is related a metering device for dispensing a dose of pressurized fluid.

BACKGROUND OF THE INVENTION

Metering devices for dispensing a dose of pressurized fluid are generally known as metered dose valves by which pressurized fluids are dispensed from containers under pressure. Normally the liquid formulations administered by the metering valve include a liquefied gas propellant and are delivered to a patient in an aerosol spray. The dose of the administered formulation should be sufficient to produce the desired physiological response. The proper amount of the formulation must be dispensed to the patient in each successive dose. Thus, any dispensing system must be able to dispense doses of the liquid formulation accurately and reliably to assure the safety and efficacy of the treatment.

Such a metered dose valve is e.g. known from WO-A-2004/0022143 that includes a valve stem which is spring biased towards the valve opening. An interior chamber is defined by a spring cage having one or more inlets from an aerosol container. The upper end of the valve stem includes a metering gasket which is sealing a metering chamber if in the activated position. In the activated position transverse side holes in a longitudinal discharge passageway of the valve stem are discharging in the metering chamber, so that the metered dose of the formulation can be dispensed.

The volume of liquid dispensed by such metered dose valves is typically in the range of 70 to 140 microliters for each actuation. However, for certain applications, like applying a liquid spray to the back of the throat in order to prevent snoring, a larger quantity of the formulation is needed, e.g. around 1.5 ml for each actuation. Such large quantities cannot be dispensed by the known metered dose valves.

Further, the above mentioned metered dose valves are developed for aerosol containers. Since the environmental regulations require that the use of aerosols should be largely reduced, or even should be completely prevented, it is an object of the present invention to provide a metering device which can be used without an environmental problematic aerosol as propellant for the fluid formulation to be administered to a patient.

It is another object of the present invention to provide a metering device system which is capable of delivering a larger volume of liquid spray for each actuation, compared to currently available metered dose valves or manually operated pump spray systems.

SUMMARY OF THE INVENTION

In accordance with one aspect of the present invention a metering device for dispensing a dose of pressurized fluid from a pressurized container is provided, which comprises a valve body to be mounted in a fluid-tight manner to the lid of a pressurized container, wherein the valve body has upper and lower openings, and captures a gasket between the lid and the upper opening of the valve body. A delivery tube penetrates through the gasket and supports a valve element, which contacts the gasket to close the delivery tube, and which is movable by the delivery tube away from the gasket to open the delivery tube. The inventive metering device further includes a cylindrical chamber having a cup-like form that is defined by an inner tube that houses at least a lower portion of the valve body, an upper roof extending radially outward from said inner tube, and an outer wall extending downward from said upper roof to a rim that defines a lower opening of the cylindrical chamber, wherein the outer wall is larger than the inner tube, such that said cylindrical chamber includes an annular volume between said inner tube and said outer wall, and a cylindrical volume below said inner tube, the lower opening of the valve body being in fluid communication with said cylindrical chamber via said inner tube. A piston is reciprocable within the cylindrical volume between an upper position and a lower position which upper and lower positions define the dispensing dose. At its upper position the piston seals the lower opening of the valve body from the cylindrical chamber, and at any of its positions the piston partitions the cylindrical volume from the lower opening of the cylindrical chamber. A fluid passage is provided from the container to the cylindrical chamber, such that, independent from the position of the piston within the cylindrical chamber, pressurized fluid can flow into the cylindrical chamber based on a pressure difference between the container and the cylindrical chamber.

In a further embodiment of the present invention the liquid passage is provided by a clearance between the piston and the inner wall of the chamber. The liquid passage can also be provided by a hole in the piston.

The metering device according to the present invention has the advantage, that with a small amount of different pieces an accurate and efficient metering of a relatively large dose of a liquid formulation, e.g. for snore preventing, is obtained. Further advantages are described in the dependent claims and in the description below.

BRIEF DESCRIPTION OF THE DRAWINGS

The invention will now be described in greater detail, by way of example only, with reference to the accompanying drawings, in which:

FIG. 8a and FIG. 8b show the mounting part of the cap shroud to the container in two different perspective views, FIG. 9a and FIG. 9b show the actuator part of the cap shroud in two different perspective views.

DETAILED DESCRIPTION OF THE INVENTION

Figure 1:
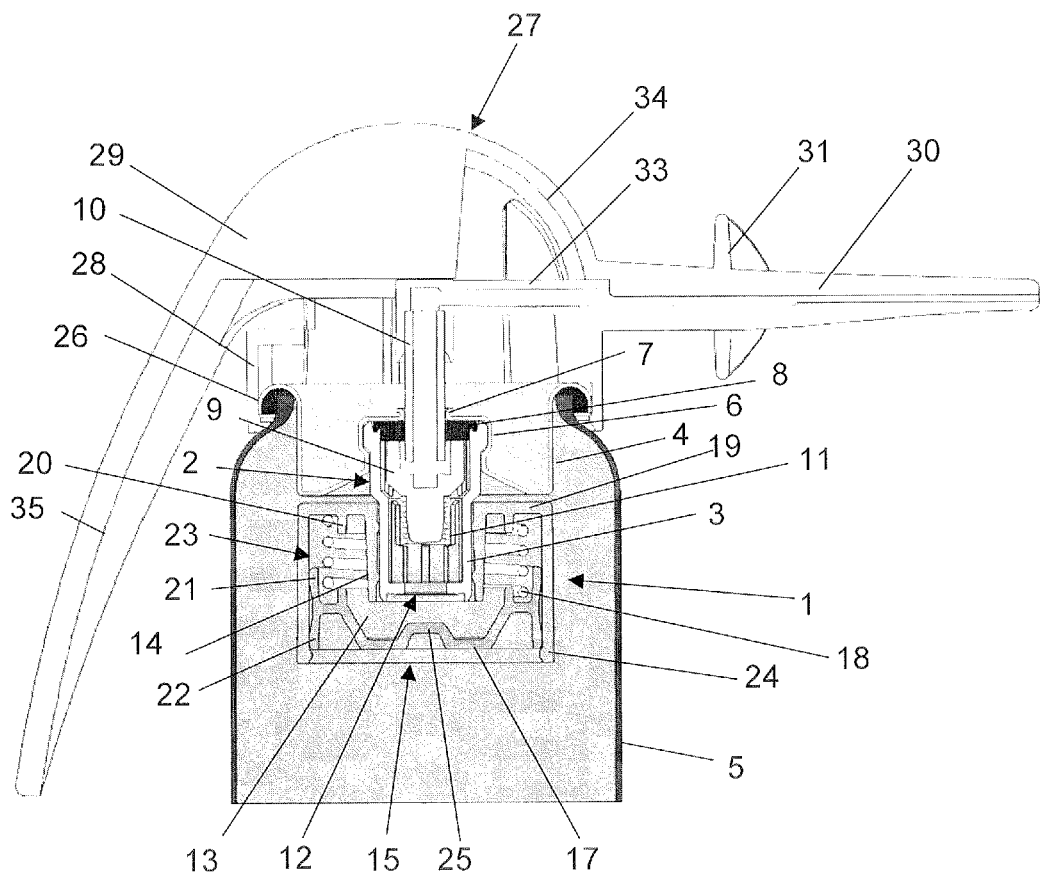
FIG. 1 shows a metering device incorporated in a container.

In FIG. 1 a metering device 1 is shown with a dispensing valve 2, comprising an elongated valve body 3 mounted in a fluid-tight manner to a lid 4 of a pressurized container 5—in the figures only the upper half of the container 5 is shown. The lid 4 has a cup-like form with an upstanding inner flange 6 and a curled-up border 7. In the present embodiment the valve body 3 is press-fitted by the lid 4 to form a fluid-tight connection with the container 5. However, also other types of connection, like welding, snapping, screwing etc. are possible. Between the curled-up border 7 and the upper edge of the valve body 3 a gasket 8 is squeezed. A valve element 9 fixedly connected with a delivery tube 10 is urged against the gasket 8 by means of a coil spring 11. The valve body 3 is entering in a cylindrical chamber 13, which circumvents the valve body 3. This chamber 13 has a cup-like form with an inner tube 14 with a first, upper opening 12, in which the valve body 3 is mounted by a pressfit connection. The chamber 13 has a second, lower opening 15 which is entering into the container 5 with a pressurized fluid. Within the chamber 13 a cylindrical piston 17 is urged to a lower position by means of a coil spring 18 which is held in the upper roof 19 of the chamber by an inner ring 20. The cylindrical piston 17 has an upper sealing lip 21 and a lower sealing lip 22, which lips are pressed towards the inner wall 23 of the chamber 13. The lower position of the piston 17 is defined a ring-shaped stop element 24. In the centre of the piston 17 a cylindrical bulge 25 is provided which cooperates with the lower opening 12 of the valve body 3, i.e. in the upper position the cylindrical bulge 25 seals the lower opening 12.

On the outer edge 26 of the container 5, viz on the rim part of the lid 4, a cap shroud 27 is mounted by means of a snap-fit connection, which consists of a lower mounting piece 28 and an upper actuator piece 29 which pieces include a mouth piece or beak 30 with a plate-shaped stop element 31. As can be readily seen in FIG. 1 a flexible L-shaped tubular joint 33 is mounted on the delivery tube 10 to connect the delivery nozzle or beak 30 with the valve element 9. The actuator piece 29 has a hinge part 34 and a handle 35. The mounting piece 28 has in the region of the beak 30 a channel 36 (see also FIG. 8a).

Figure 2:
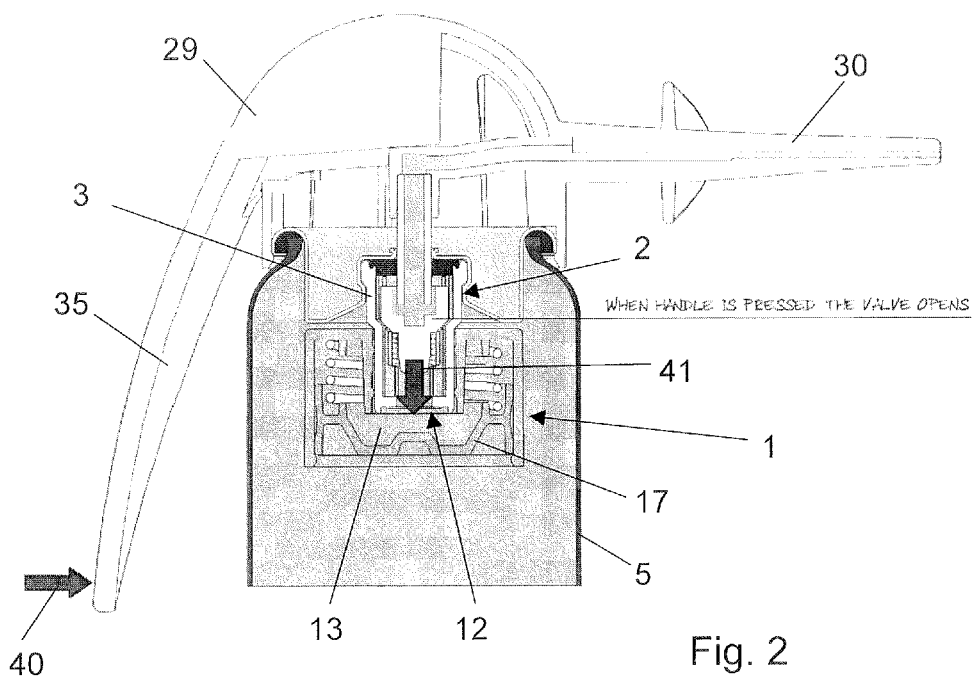
FIG. 2 shows the metering device in a first position in which the valve is opened.
Figure 3:
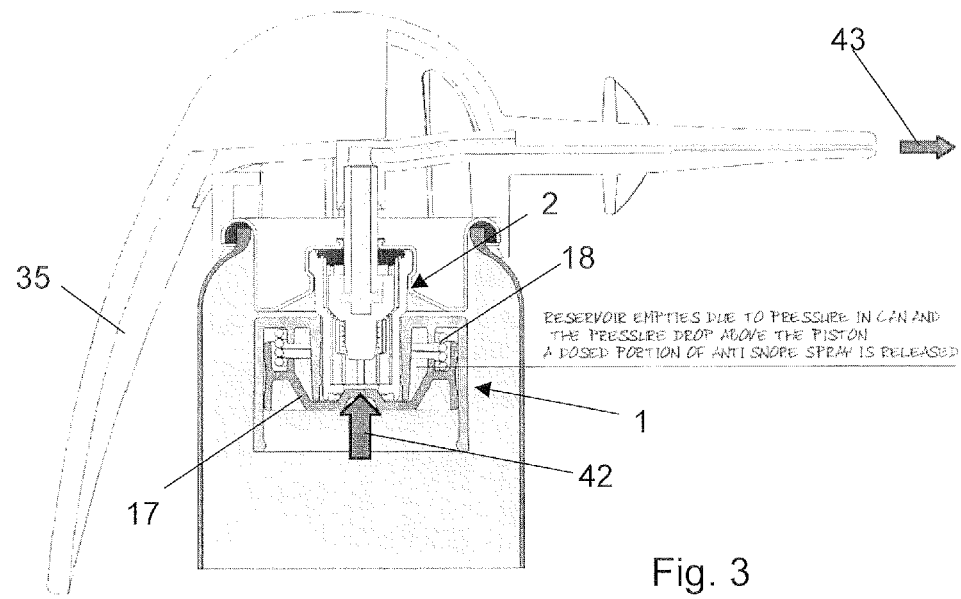
FIG. 3 shows the metering device in a second position in which the metering chamber is emptied and a dose of a medicinal formulation is delivered.
Figure 4:
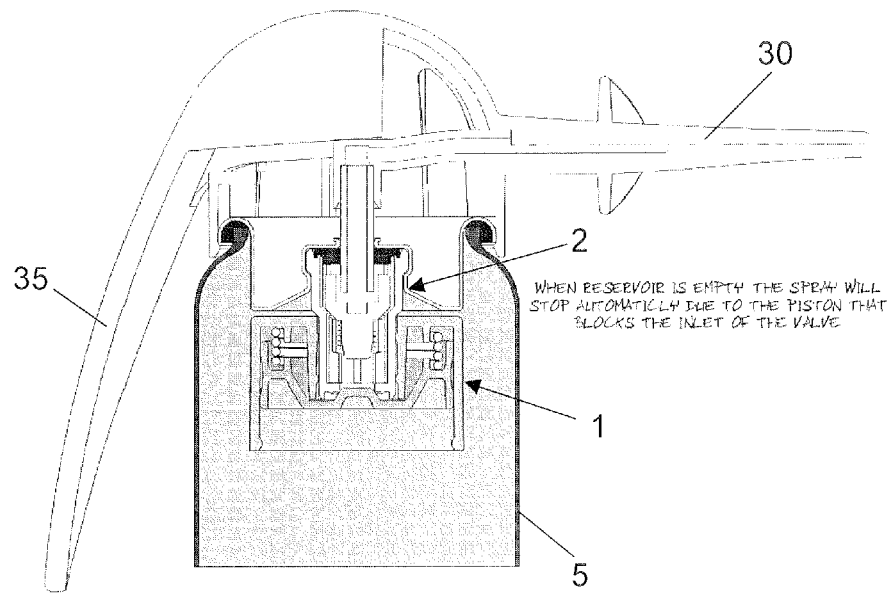
FIG. 4 shows the metering device when the metering chamber is emptied.

The function of the metering device 1 is as follows:

In FIG. 1 the dispensing valve 2 is closed and the piston 17 is in the lower position urged by the coil spring 18 to the inner ring or stop 20. In FIG. 2 the handle 35 is pushed towards the container 5 (see arrow 40) so that the actuator piece 29 is tilted and the dispensing valve 2 is opened (see arrow 41). Thus, the chamber 13 is in open connection to the nozzle or beak 30 so that a pressure drop results and the fluid which has an overpressure will flow from the chamber 13 to the nozzle 30, while the force of the overpressure in the container 5 urges the piston 17 upwards until the lower opening 12 of the valve body 3 is closed (see arrow 42 in FIG. 3). The coil spring 18 is designed to have a weak spring force with respect to the overpressure in the container 5. Thus, the chamber 13 is emptied by a dose of the fluid, which dose is defined by the lower position and the upper position of the piston 17 within the chamber 13, and is ejected from the nozzle 30 as indicated by arrow 43. While the piston 17 is closing the lower opening 12 of the valve body 3, the flow of fluid is automatically stopped (FIG. 4). After delivery of the fluid dose the handle 35 is released and the dispensing valve 2 is closed (see arrow 44 in FIG. 5), whereas the piston 17 is still sealing the opening 12 as indicated by arrow 45. The upper and lower sealing lips 21 and 22 of the piston 17 are designed such that there will be no perfect sealing, i.e. there is little clearance between the sealing lips 21 and 22 and the inner wall 23 of the chamber 13, so that due to the overpressure in the container 5 fluid will flow from the container 5 to the chamber 13 as indicated by the arrows 46 in FIG. 6. The coil spring 18 will ensure that the piston 17 is pushed completely downwards to the inner ring or stop 20. Thus, chamber 13 is refilled with fluid until the pressure in the chamber 13 equals the pressure in the container 5. Thereupon the next dose can be spent by the metering device 1.

Figure 12A:
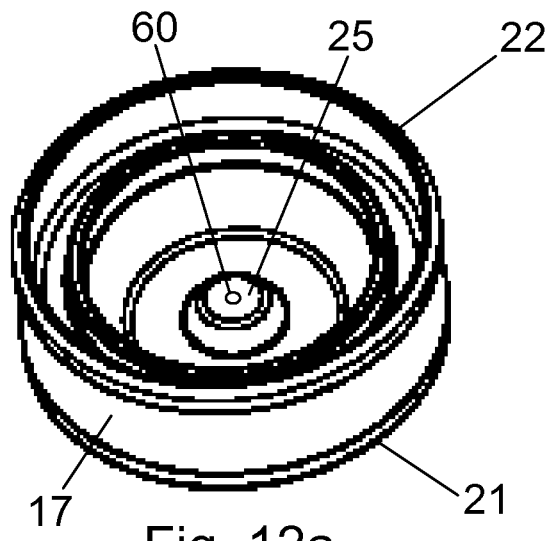
FIG. 12a and FIG. 12b show an alternate design of the piston in two different perspective views.
Figure 12B:
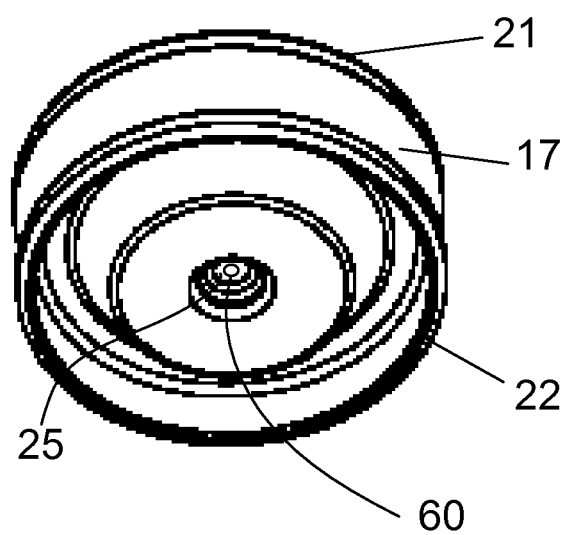

Instead of the little clearance between the piston 17 and the inner wall 23 of the chamber 13, a small hole 60 in the piston 17 can be provided which is provided in axial direction, as shown in FIGS. 12a and 12b. Dependent from the diameter of the hole 60 the fluid will flow slower or faster into the chamber 13, so that the refill speed can be determined. Therefore, the metering device 1 can be used only after a specific time period, e.g. approximately 10 sec., so that overdosing can be prevented.

All components of the metering device are made of a hard plastic material, preferably in PET or PP.

Figure 6:
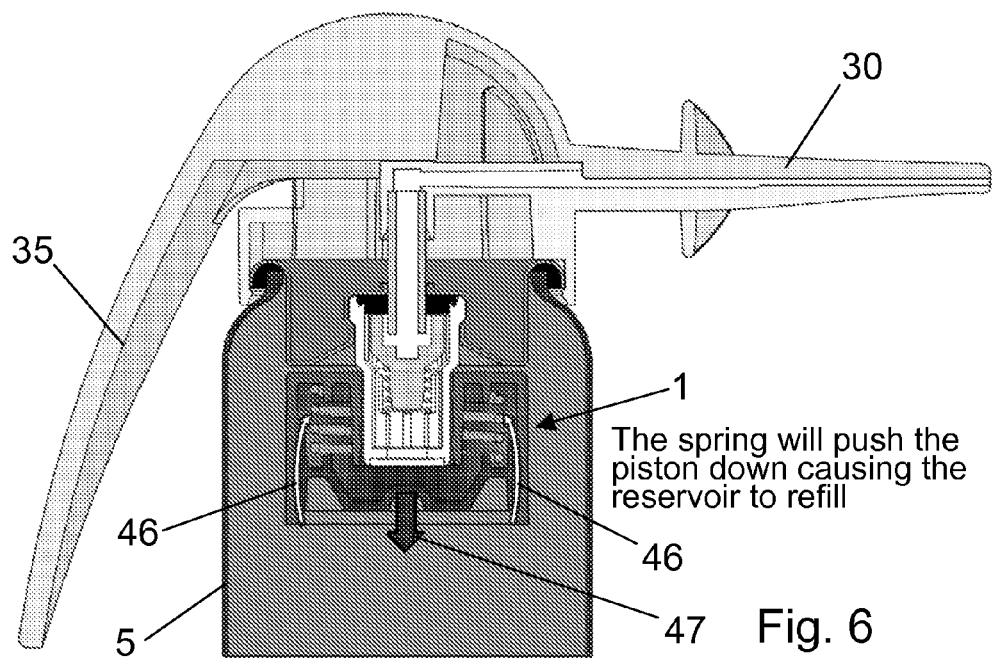
FIG. 6 shows the metering device in a fourth position in which the piston returns to its initial position in which the metering chamber is filled with fluid again.
Figure 7:
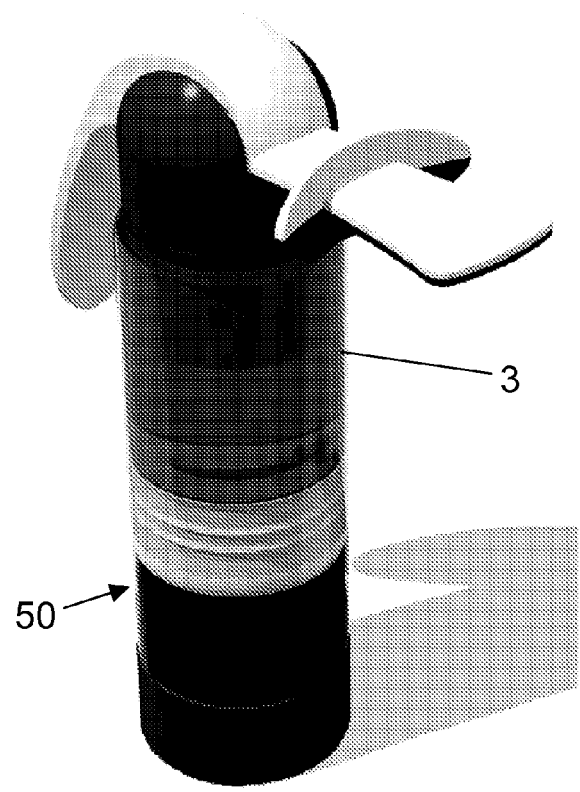
FIG. 7 shows a container with the metering device in a perspective view.

In FIG. 7 a perspective view on the metering device 1 with a pressurized container 5 is shown. The lower part 50 of the container incorporates a pressure control system as described in WO-A-2005/082744. Especially in FIGS. 5 and 6 thereof a container with a pressure control device and a further piston is shown, which piston is pushed upwards by a gas with a predetermined excess pressure, such that there is only liquid between the piston and the metering device 1. In such a system the fluid pressure in the container 5 will be kept at a constant level. Thus, the overpressure on the fluid will cause the fluid to flow into the metering chamber 13. Therefore the dose as spent by the metering device 1 will remain constant as well.

Figure 5:
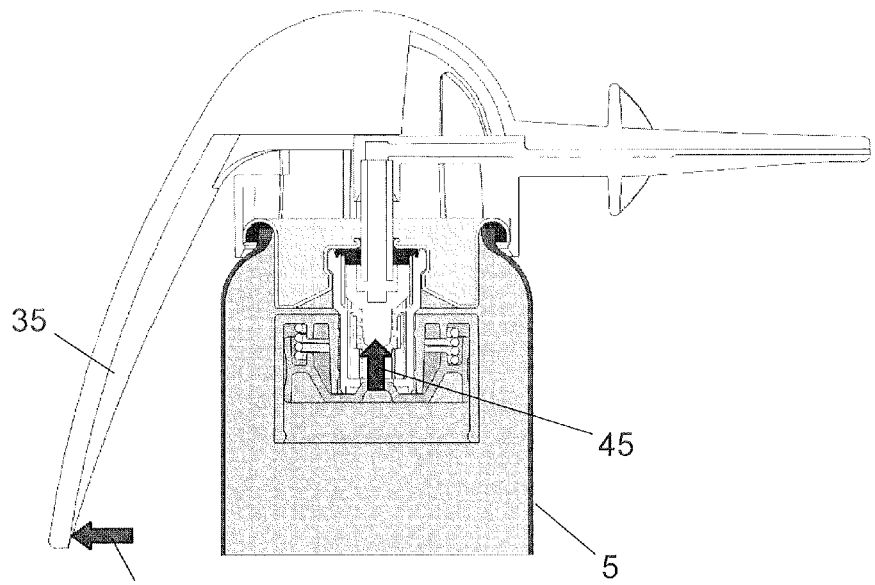
FIG. 5 shows the metering device in a third position in which the valve is closed.

Instead of the additional piston as shown in FIGS. 5 and 6 of WO-A-2005/082744 a dip-tube as shown in FIG. 7 of WO-A-2005/082744 can be provided which enters into the chamber 13 of the metering device 1 and ends at the bottom of the container 5 above the pressure control device. In such a case no liquid passage is provided by the piston 17 of the metering device 1.

In FIGS. 8a and 8b the mounting part of the cap shroud is shown in two different perspective views. The channel 36 with a small diameter of about 0.5 mm is provided for dosing the fluid with a predetermined fluid pressure, so that the dose can be entered deep enough into the throat of the patient. As can be seen in FIG. 8b there are further some internal fins 51 for positioning the lower mounting piece 28 properly to the container 5.

In FIGS. 9a and 9b the upper actuator piece 29 with the hinge part 34 is shown in two different perspective views. Further at the beginning of channel 36 a cylindrical recess 52 is provided for containing an insert with a small through-hole in order to produce a micro mist. Alternatively, the recess 52 can be provided at the end of the channel 36, i.e. at the end of the beak 30, so that the insert can produce a micro mist with a predetermined space angle.

Figure 10A:
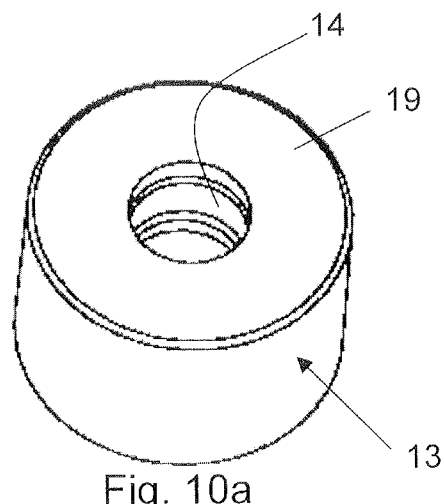
FIG. 10a and FIG. 10b show the metering chamber in two different perspective views.
Figure 10B:
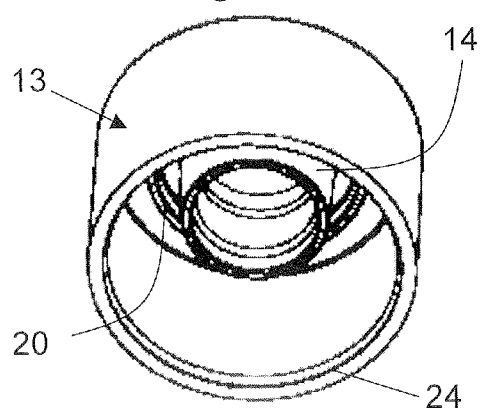

In FIGS. 10a and 10b the metering chamber 13 is shown in two different perspectives. The inner ring 20 for retaining the coil spring 18 on place and the inner tube 14 are ready visible.

Figure 11A:
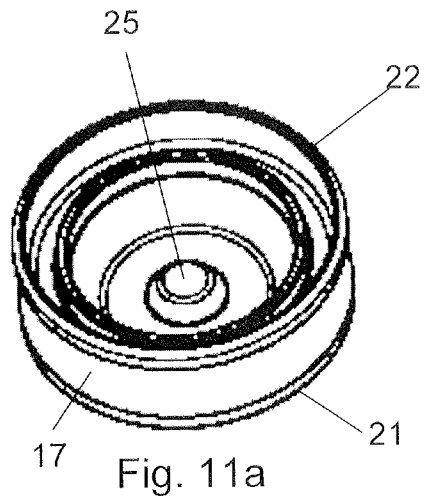
FIG. 11a and FIG. 11b show the piston in two different perspective views.
Figure 11B:
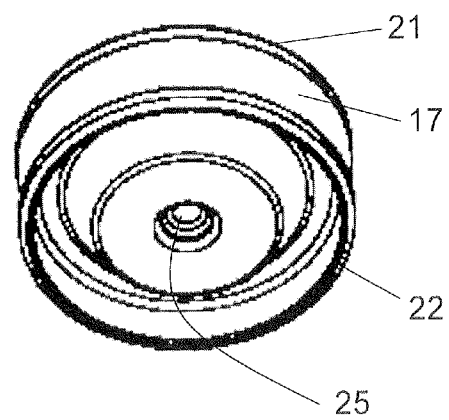

In FIGS. 11a and 11b the piston 17 with the sealing lips 21 and 22 and the cylindrical bulge 25 is also depicted in perspective view.

In FIGS. 12a and 12b, an alternate design of the piston 17 is depicted in perspective view.

It will be appreciated to the skilled person that mounting of the dispensing valve 2 to the container 5 can also be made by welding, snapping or screwing. Further, the design of the piston 17 may be changed in that the seal by the bulge 25 is instead provided by an outside ring partly encompassing the inner tube 14.

Various modifications and alterations to this invention will become apparent to the skilled person without departing from the scope and the spirit of the invention.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A metering device for dispensing a dose of a pressurized fluid from a pressurized container, said metering device comprising:
    a valve body mountable in a fluid-tight connection to a lid of a pressurized container and having upper and lower openings;
    a gasket captured between the lid and the upper opening of the valve body;
    a delivery tube penetrating through the gasket;
    a valve element supported by the delivery tube within the valve body, said valve element contacting the gasket to close the delivery tube and movable by the delivery tube away from the gasket to open the delivery tube;
    a cylindrical chamber having a cup-like form that is defined by an inner tube that houses at least a lower portion of the valve body, an upper roof extending radially outward from said inner tube, and an outer wall extending downward from said upper roof to a rim that defines a lower opening of the cylindrical chamber, wherein the outer wall is larger than the inner tube, such that said cylindrical chamber includes an annular volume between said inner tube and said outer wall, and a cylindrical volume below said inner tube, the lower opening of the valve body being in fluid communication with said cylindrical chamber via said inner tube;
    a piston reciprocable within the cylindrical volume between an upper position and a lower position, which upper and lower positions define the dose of pressurized fluid to be dispensed, wherein at its upper position the piston seals the lower opening of the valve body from the cylindrical chamber and at any of its positions the piston partitions the cylindrical volume from the lower opening of the cylindrical chamber; and
    a fluid passage from the container to the cylindrical chamber, such that, independent from the position of the piston within the cylindrical chamber, pressurized fluid can flow into the cylindrical chamber based on a pressure difference between the container and the cylindrical chamber.

2. The metering device according to claim 1, wherein the fluid passage is provided by a clearance between the piston and the outer wall of the cylindrical chamber.

3. The metering device according to claim 1, wherein the fluid passage is provided by a hole in the piston.

4. The metering device according to claim 1, wherein an elastic element is provided urging the piston to the lower position.

5. The metering device according to claim 1, wherein the fluid passage includes a dip-tube that enters into the cylindrical chamber-through a hole in the outer wall of the cylindrical chamber.

6. The metering device according to claim 4, wherein the elastic element is a coil spring.

7. The metering device according to claim 1, wherein an actuator is mounted on the container, comprising an elongated mouth piece and a resilient connecting tube element, which is mounted on the delivery tube.

8. The metering device according to claim 7, wherein the actuator is mounted tiltable on the container.

9. The metering device according to claim 7, wherein the elongated mouth piece has a plate-shaped stop element.

10. The metering device according to claim 7, wherein the mouth piece has the shape of a duck beak.

11. A pressurized container comprising:
    a pressure control system with a pressure control device for maintaining a predetermined excess pressure in the container; and
    the metering device according to claim 1 mounted in a fluid-tight manner to a lid of the container.

12. The pressurized container according to claim 11, wherein a piston is provided in the container above the pressure control device.

13. The pressurized container according to claim 11, wherein the fluid passage is provided by a dip-tube entering the chamber of the metering device and ending at the bottom of the container above the pressure control device.

* * * * *